US009977398B2

(12) United States Patent
Lee et al.

(10) Patent No.: US 9,977,398 B2
(45) Date of Patent: May 22, 2018

(54) CRUM CHIP AND IMAGE FORMING DEVICE FOR COMMUNICATING MUTUALLY, AND METHOD THEREOF

(75) Inventors: Jae-Yoon Lee, Seoul (KR); Hong-Rok Woo, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 28 days.

(21) Appl. No.: 13/445,535

(22) Filed: Apr. 12, 2012

(65) Prior Publication Data

US 2013/0063770 A1 Mar. 14, 2013

(30) Foreign Application Priority Data

Sep. 9, 2011 (KR) ........................ 10-2011-0092060

(51) Int. Cl.
*H04N 1/64* (2006.01)
*G03G 21/18* (2006.01)

(52) U.S. Cl.
CPC ................................ *G03G 21/1882* (2013.01)

(58) Field of Classification Search
CPC ........... G03G 21/1882; G03G 15/0863; H04N 1/4433
USPC .................. 358/1.15; 347/59, 19; 399/8, 24; 713/170
See application file for complete search history.

(56) References Cited

U.S. PATENT DOCUMENTS 6,267,463 B1 * 7/2001 Paulsen ................ B41J 2/17546 347/19
6,640,294 B2 10/2003 Debiez et al.
7,249,108 B1 7/2007 Walmsley et al.
7,650,388 B2 1/2010 Rodriguez et al.
8,069,477 B2 11/2011 Lee et al.
8,069,478 B2 11/2011 Cho et al.
8,073,355 B2 12/2011 Lee et al.
8,176,549 B2 5/2012 Lee et al.
8,330,966 B2 12/2012 Lee et al.
(Continued)

FOREIGN PATENT DOCUMENTS

CN 1235300 A 11/1999
CN 102112960 6/2011
(Continued)

OTHER PUBLICATIONS

Extended European Search Report issued Jun. 29, 2012 in corresponding European Patent Application No. 12160258.5.
(Continued)

*Primary Examiner* — Tammy Paige Goddard
*Assistant Examiner* — Bharatkumar Shah
(74) *Attorney, Agent, or Firm* — Staas & Halsey LLP

(57) ABSTRACT

An image forming device is provided. The device includes a main body which includes a main controller controlling operations of the image forming device, a consumable unit mounted on the main body to enable communication with the main controller, and a CRUM chip which is provided in the consumable unit and stores usage information of the consumable unit and characteristics information The main controller and the CRUM chip transmit and receive signals which include data and integrity detection data between each other. The integrity detection data is generated by accumulating and reflecting integrity detection data included in a previous signal.

15 Claims, 10 Drawing Sheets

(56) References Cited

U.S. PATENT DOCUMENTS

| | | | |
|---|---|---|---|
| 8,332,934 B2 | 12/2012 | Lee et al. | |
| 8,386,781 B2 | 2/2013 | Cho et al. | |
| 8,422,058 B2 | 4/2013 | Zona et al. | |
| 8,453,260 B2 | 5/2013 | Lee et al. | |
| 8,537,382 B2 | 9/2013 | Tokairin | |
| 8,973,152 B2 | 3/2015 | Lee et al. | |
| 9,141,816 B2 | 9/2015 | Refstrup | |
| 9,203,980 B2 | 12/2015 | Lee et al. | |
| 9,495,549 B2 | 11/2016 | Refstrup | |
| 9,619,663 B2 | 4/2017 | Refstrup | |
| 2003/0126400 A1 | 7/2003 | Debiez et al. | |
| 2003/0215245 A1 | 11/2003 | Silence et al. | |
| 2006/0136989 A1 | 6/2006 | Rodriguez et al. | |
| 2006/0193642 A1 | 8/2006 | Morimoto | |
| 2007/0047974 A1* | 3/2007 | Tanaka | G03G 21/1882 399/8 |
| 2007/0058991 A1 | 3/2007 | Rommelmann et al. | |
| 2009/0129559 A1 | 5/2009 | Fukami et al. | |
| 2009/0214249 A1 | 8/2009 | Lee et al. | |
| 2009/0220077 A1 | 9/2009 | Lee et al. | |
| 2009/0222664 A1* | 9/2009 | Cho | G03G 15/5066 713/710 |
| 2009/0222886 A1 | 9/2009 | Lee et al. | |
| 2010/0039485 A1 | 2/2010 | Rodriguez et al. | |
| 2010/0128298 A1 | 5/2010 | Matsugashita | |
| 2011/0002002 A1 | 1/2011 | Lee et al. | |
| 2011/0004746 A1 | 1/2011 | Lee et al. | |
| 2011/0004768 A1 | 1/2011 | Cho et al. | |
| 2011/0044703 A1 | 2/2011 | Fuse | |
| 2011/0093702 A1 | 4/2011 | Eom et al. | |
| 2011/0109938 A1 | 5/2011 | Refstrup | |
| 2012/0134687 A1 | 5/2012 | Jones et al. | |
| 2012/0222130 A1 | 8/2012 | Lee et al. | |
| 2013/0063770 A1 | 3/2013 | Lee et al. | |
| 2013/0070301 A1 | 3/2013 | Lee et al. | |
| 2013/0108285 A1 | 5/2013 | Spink et al. | |
| 2015/0343792 A1 | 12/2015 | Refstrup | |
| 2017/0032135 A1 | 2/2017 | Refstrup | |
| 2017/0300008 A1 | 10/2017 | Lee et al. | |

FOREIGN PATENT DOCUMENTS

| | | |
|---|---|---|
| CN | 102481956 A | 5/2012 |
| CN | 102682238 | 9/2012 |
| EP | 0281223 | 9/1988 |
| EP | 0 956 963 A1 | 11/1999 |
| JP | 11-334059 | 12/1999 |
| KR | 10-2006-0059668 | 6/2006 |
| KR | 10-2009-0094726 | 9/2009 |
| KR | 10-2011-0014535 | 2/2011 |
| KR | 10-2011-0023412 | 3/2011 |
| KR | 10-1780734 | 9/2017 |
| RU | 2 313 821 | 1/2006 |
| RU | 2 420 775 C2 | 6/2011 |
| WO | 2004/068334 A1 | 8/2004 |
| WO | WO 2009/145774 A1 | 12/2009 |

OTHER PUBLICATIONS

International Search Report and Written Opinion mailed Nov. 27, 2013 in related International Application No. PCT/KR2013/006430.
Korean Office Action mailed Jul. 22, 2014 in related Korean Application No. 10-2013-0048712.
Office Action mailed Aug. 22, 2014 in related U.S. Appl. No. 13/963,205.
U.S. Notice of Allowance dated Apr. 6, 2015 in copending U.S. Appl. No. 13/963,205.
European Search Report dated May 4, 2015 in corresponding European Application No. 13177300.4.
European Examination Report dated Jun. 8, 2015 in corresponding European Application No. 13177300.4.
U.S. Office Action dated Sep. 29, 2015 in U.S. Appl. No. 13/721,289.
U.S. Appl. No. 13/721,289, filed Dec. 20, 2012, Jae-Hyeong Jeong, Samsung Electronics Co., Ltd.
U.S. Office Action dated Nov. 17, 2015 in U.S. Appl. No. 13/963,205.
Korean Office Action dated Dec. 1, 2015 in corresponding Korean Application No. 10-2011-0114192.
Notice of Allowance dated Mar. 29, 2016 in U.S. Appl. No. 13/963,205.
Office Action dated Feb. 22, 2016 in European Patent Application No. 13 177 300.4.
Office Action dated Apr. 26, 2016 in Chinese Patent Application No. 201210331411.X.
Russian Office Action dated Jul. 11, 2016 in corresponding Russian Patent Application No. 2012138542.
Office Action dated Jul. 29, 2016 in related U.S. Appl. No. 13/963,205.
Notice of Allowance dated Nov. 23, 2016 in co-pending U.S. Appl. No. 13/963,205.
Chinese Office Action dated Dec. 7, 2016 in corresponding Chinese Patent Application No. 201210331411.X.
Korean Office Action dated Dec. 7, 2016 in corresponding Korean Patent Application No. 10-2011-0092060.
European Office Action dated Feb. 2, 2017 in corresponding European Patent Application No. 12 130 258.5.
Russian Notice of Allowance dated Nov. 2, 2016 in corresponding Russian Patent Application No. 2013139377.
Notice of Allowance dated Mar. 20, 2017 in co-pending U.S. Appl. No. 13/963,205.
Chinese Office Action dated May 2, 2017 in corresponding Chinese Patent Application No. 201380073466.8.
Extended European Search Report dated Feb. 22, 2017 in corresponding European Application No. 16 19 7092.
Chinese Office Action dated May 26, 2017 in corresponding Chinese Patent Application No. 201210331411.X.
Russian Decision on Grant dated May 12, 2017 in corresponding Russian Application No. 2012138542.
Chinese Office Action dated Oct. 10, 2017 from Chinese Patent Application No. 201210331411.X, 13 pages.
Chinese Office Action dated Oct. 16, 2017 from Chinese Patent Application No. 201380073466.8, 19 pages.
U.S. Notice of Allowance dated Oct. 27, 2017 from U.S. Appl. No. 15/639,500.
Advisory Action dated Jul. 15, 2015 from U.S. Appl. No. 13/963,205.
U.S. Office Action dated Aug. 28, 2014 in co-pending U.S. Appl. No. 13/721,289.
U.S. Office Action dated Mar. 13, 2015 in co-pending U.S. Appl. No. 13/721,289.
U.S. Notice of Allowance dated Jan. 12, 2016 in co-pending U.S. Appl. No. 13/721,289.
Notice of Allowance dated Nov. 9, 2017 from U.S. Appl. No. 15/677.603.
Korean Office Action dated Nov. 10, 2017 from Korean Patent Application No. 10-2017-0118641, 9 pages.
U.S. Appl. No. 15/639,500, filed Jun. 30, 2017, Jae-yoon Lee, S-Printing Solution Co., Ltd.
U.S. Appl. No. 13/963,205, filed Aug. 9, 2013, Jae-yoon Lee, S-Printing Solution Co., Ltd.
U.S. Appl. No. 15/677,603, dated Aug. 15, 2017, Jae-yoon Lee, S-Printing Solution Co., Ltd.

* cited by examiner

CRUM CHIP AND IMAGE FORMING DEVICE FOR COMMUNICATING MUTUALLY, AND METHOD THEREOF

CROSS-REFERENCE TO RELATED APPLICATIONS

This application is related to and claims priority to Korean Patent Application No. 10-2011-0092060, filed in the Korean Intellectual Property Office on Sep. 9, 2011, the disclosure of which is incorporated herein by reference.

BACKGROUND

1. Field

The embodiments discussed herein relate to a CRUM chip and image forming device for communicating mutually and method thereof, and more particularly, to a Customer Replaceable Unit Monitoring (CRUM) chip and image forming device for communicating mutually for detecting whether data is integral, using integrity detection data in a communication process, and a method thereof.

2. Description of the Related Art

As computers increasingly becoming widespread, the dissemination rate of peripheral devices of computers is also increasing. Computer peripheral devices include image forming devices such as printers, facsimiles, scanners, copy machines, and multi-function printers.

Image forming devices may use ink or toner to print images on paper. Ink or toner is used each time an image forming operation is performed, and thus runs out when used for more than a predetermined period of time. In such a case, the unit in which the ink or toner is stored has to be replaced. Such parts or components which are replaceable in the process of using an image forming device may be defined as consumable units or replaceable units. For convenience of explanation, these will be referred to as consumable units in this document.

In addition to these units which must be replaced due to depletion of ink or toner as discussed above, there are also consumable units having characteristics that change when the units are used for more than a certain period of time, and thus are replaced to achieve a satisfactory printing quality. Consumable units include color replacement for developing machines, and parts such as intermediate transfer belts.

In the case of laser image forming devices, electrification units, intermediate units or settlement units may be used, in which various types of rollers and belts used in each unit may be worn out or degenerated when used for more than the marginal life span. Accordingly, the quality of image may be severely deteriorated. A user must replace each component, that is, each consumable unit at an appropriate replacing period so that printing operation can be performed to produce clean images.

To manage consumable units more efficiently, memories may be attached to consumable units, so as to exchange information with the body of an image forming device.

That is, it is possible to record various usage information such as the number of printed paper, number of output dots, and usage period into the memory of the consumable unit, for management of a time to replace the consumable unit.

For such information management, a controller provided in the body of an image forming device and a memory unit provided in the consumable unit communicate with each other. However, there are numerous variables in the communication process. For instance, there may be noise interruption caused, for example, by an electronic circuit or motor provided, for example, in the image forming device, or an attack by a hacker who tries to control the controller or the memory unit for malicious purposes.

Communication data may change due to these variables. For instance, once a job is completed, a consumable unit may transmit information such as the number of printing pages, number of dots, and remaining toner volume to a controller, and copies the information to a nonvolatile memory of the controller. Upon the data being read as an incorrect value, for example, such as 0xFFFFFFFF, there is a risk that the controller may perceive that the life of the pertaining consumable unit has ended. In this case, the consumable unit will not longer be able to be used. In contrast, regarding a consumable unit of which the life span has ended, a hacker may reset the consumable user information, for example, to a value of "0" with a malicious purpose, in order to inappropriately recycle the consumable unit. Accordingly, a user may attempt to use a consumable unit of which the life has ended, causing problems such as breakdown of the image forming device or deterioration of definition.

Accordingly, the necessity for a technology which efficiently detects communication errors between a consumable unit, and an image forming device to seek safety of the data is required.

SUMMARY

Additional aspects and/or advantages will be set forth in part in the description which follows and, in part, will be apparent from the description, or may be learned by practice of the invention.

An aspect of an exemplary embodiments relates to a CRUM chip and an image forming device for safety of communication, using integrity detection data, and a communication method thereof.

According to an exemplary embodiment of the present disclosure, an image forming device may include a body which includes a controller controlling operations of the image forming device, a consumable unit which may be mounted on the body so that communication with the controller is possible, and a p circuit which is provided in the consumable unit, and stores usage information and characteristics information of the consumable unit. According to an exemplary embodiment, the circuit is a microprocessor. According to an exemplary embodiment, the microprocessor is a (Customer Replaceable Unit Monitoring) CRUM chip.

The controller and the (Customer Replaceable Unit Monitoring) CRUM chip may transmit and receive signals which include data and integrity detection data regarding the data with each other, and the integrity detection data may be generated by accumulating and reflecting integrity detection data included in previous signals.

When a signal to which the integrity detection data is added is received, the controller and the CRUM chip may separate the integrity detection data from the received signal, compare integrity detection data generated itself from remaining data and the separated integrity detection data to detect integrity of the signal, and when it is determined that the signal is integral, may temporarily store the signal.

Upon an image forming job being completed, the controller and the CRUM chip may use integrity detection data included in a signal received in a process of performing the image forming job to detect integrity of entire signals transmitted and received in the process of performing the image forming job, and, when it is determined that the entire signals are integral as a result of the detection, the controller and the CRUM chip may store the signals which were temporarily stored.

The data included in the signal includes at least one of a command, information subject to recording, result information of operations according to the command, result information of integrity detection regarding a previous signal, and indicator information for notifying a location of the integrity detection data. The result information of the integrity detection may be excluded from a signal initially transmitted and received between the controller and the CRUM chip.

The integrity detection data may be a result value of logical calculus on the data, a result value generated by applying a predetermined mathematical formula to the data, or a result value of encrypting the data.

According to an exemplary embodiment of the present disclosure, an image forming device may include a data processing unit which generates data to be transmitted to a CRUM chip provided in a consumable unit mountable on the image forming device, a generating unit which generates a first integrity detection data using the generated data; an interface unit which transmits a first signal which includes the data and the first integrity detection data to the CRUM chip, and receives a second signal corresponding to the first signal from the CRUM chip, a detection unit which separates a second integrity detection data included in the second signal, and detects integrity of the second signal; and a controlling unit which performs a subsequent communication according to a result of detection by the detection unit.

The second integrity detection data may be generated by accumulating and reflecting the first integrity detection data.

The detection unit may generate data subject to comparison using remaining data included in the second signal, compare the second integrity detection data separated from the second signal and the data subject to comparison, and detect integrity of the second signal. Herein, the controlling unit may stop the subsequent communication when it is determined that the second signal is in an error state.

The image forming device may include a temporary storage unit which temporarily stores data determined to be integral and integrity detection data.

The generating unit may generate a third integrity detection data based on the subsequent data and the second integrity detection data, when there exists a subsequent data to be transmitted to the CRUM chip, in the case where the second signal is integral.

The interface unit may transmit a third signal which includes the third integrity detection data and the subsequent data to the CRUM chip.

The detection unit may detect integrity of entire signals received in the process of performing the image forming job, using final integrity detection data included in a signal received in the process of performing the image forming job, when an image forming job is completed.

The image forming device may include a storage unit which records data temporarily stored in the temporary storage unit when it is determined that the entire signals are integral as a result of the final detection.

The data may include at least one of a command, information subject to recording, result information of performing operations according to the command, result information of integrity detection regarding a previously received signal, and indicator information for notifying a location of the integrity detection data. The result information of integrity detection may be excluded from a signal initially transmitted and received between the CRUM chip.

The integrity detection data may be a result value of logical calculus on the data, a result value generated by applying a predetermined mathematical formula regarding the data, or a result value of encrypting the data.

According to an exemplary embodiment of the present disclosure, a CRUM chip mountable on a consumable unit of an image forming device includes an interface unit which receives a first signal which includes a first data and a first integrity detection data regarding the first data from a body of the image forming device; a detection unit which separates the first integrity detection data from the first signal, and detects integrity of the first signal, a temporary storage unit which temporarily stores the data included in the first signal and the first integrity detection data, when it is determined that the first signal is integral; a data processing unit which generates the second data, in a case where there exists a second data to be transmitted to the body of the image forming device; a generating unit which generates a second integrity detection data, using the second data and the first integrity detection data, a controlling unit which controls the interface unit to transmit the second data and a second signal which includes the second integrity detection data to the body of the image forming device, and a storage unit for recording temporarily stored data to the temporary storage unit.

The detection unit may generate data subject to comparison using remaining data included in the first signal, compare the second integrity detection data separated from the second signal and the data subject to comparison, and when they are identical, determine that the second signal is integral, and when they are not identical, determine that the second signal is in an error state.

The detection unit may perform integrity detection regarding the third signal when a third signal which includes a third integrity detection data generated by accumulating and reflecting the second integrity detection data is received through the interface unit.

When an image forming job is completed, the detection unit may detect integrity of entire signals received in a process of performing the image forming job, using a final integrity detection data included in a signal received in the process of performing the image forming job.

The controlling unit may store data which was temporarily stored in the temporary storage unit when it is determined that the entire signals are integral as a result of the final detection.

The first data or the second data may include at least one of a command, information subject to recording, result information of performing operations according to the command, result information of integrity detection regarding a previously received signal, and indicator information for notifying a location of the integrity detection data.

The result information of integrity detection may be excluded from a signal initially transmitted and received between the CRUM chip.

The integrity detection data may be a result value of logical calculus on the data, a result value generated by applying a predetermined mathematical formula regarding the data, or a result value of encrypting the data.

According to an exemplary embodiment of the present disclosure, a communication method of an image forming device which includes a body having a controller, and a consumable unit having a CRUM chip communicable with the controller may include generating data to be transmitted to the CRUM chip; generating a first integrity detection data using the generated data; transmitting a first signal including the data and the first integrity detection data to the CRUM chip; receiving a second signal corresponding to the first signal from the CRUM chip; and separating a second integrity detection data included in the second signal and detecting integrity of the second signal. The second integrity detection data may be generated by accumulating and reflecting the first integrity detection data.

The detecting may include separating the second integrity detection data from the second signal; generating data subject to comparison using remaining data after separating the second integrity detection data; and comparing the second integrity detection data separated from the second signal and the data subject to comparison, and when they are identical, determining that the second signal is integral, and when they are not identical, determining that the second signal is in an error state.

The detecting may include temporarily storing data of the second signal and the second integrity detection data when it is determined that the second signal is integral.

The detecting may include generating a third integrity detection data based on the subsequent data and the second integrity detection data, when there exists a subsequent data to be transmitted to the CRUM chip; and transmitting a third signal which includes the third integrity detection data and the subsequent data to the CRUM chip.

The detecting may include detecting integrity of entire signals received from a process of performing the image forming job, using a final integrity detection data included in a signal received in the process of performing the image forming job, when an image forming job is completed; and storing the signals which were temporarily stored, upon determining that the entire signals are integral as a result of the final detection.

The data may include at least one of a command, information subject to recording, result information of performing operations according to the command, result information of integrity detection regarding a previously received signal, and indicator information for notifying a location of the integrity detection data, and the result information of integrity detection may be excluded from a signal initially transmitted and received between the CRUM chip.

The integrity detection data may be a result value of logical calculus on the data, a result value generated by applying a predetermined mathematical formula regarding the data, or a result value of encrypting the data.

According to an exemplary embodiment of the present disclosure, a communication method of a CRUM chip mountable on a consumable unit of an image forming device includes receiving a first signal which includes a first data and a first integrity detection data regarding the first data from a body of the image forming device, separating the first integrity detection data from the first signal and detecting integrity of the first signal, temporarily storing the data included in the first signal and the first integrity detection data, when it is determined that the first signal is integral, generating the second data, when there exists a second data to be transmitted to the body of the image forming device, generating a second integrity detection data, using the second data and the first integrity detection data, and transmitting a second signal which includes the second data and the second integrity detection data to the body of the image forming device.

The detecting includes separating the first detection data from the first signal, generating data subject to comparison using remaining data included in the first signal, and comparing the second integrity detection data separated from the second signal and the data subject to comparison, and when they are identical, determining that the second signal is integral, and when they are not identical, determining that the second signal is in an error state.

In addition, the detecting may include performing integrity detection regarding the third signal when a third signal which includes a third integrity detection data generated by accumulating and reflecting the second integrity detection data is received from the body of the image forming device.

The detecting may include detecting integrity of entire signals received in a process of performing the image forming job, using a final integrity detection data included in a signal received in the process of performing the image forming job, when an image forming job is completed, and storing the signals which were temporarily stored, when it is determined that the entire signals are integral as a result of the final detection.

In addition, the first data or the second data may include at least one of a command, information subject to recording, result information of performing operations according to the command, result information of integrity detection regarding a previously received signal, and indicator information for notifying a location of the integrity detection data.

The result information of integrity detection may be excluded from a signal initially transmitted and received between the CRUM chip.

The integrity detection data may be a result value of logical calculus on the data, a result value generated by applying a predetermined mathematical formula regarding the data, or a result value of encrypting the data.

As aforementioned, according to various exemplary embodiments of the present disclosure, it is possible to pursue safety of the entire communication by accumulatively using the integrity detection data used in previous communications. Accordingly, information of consumable units and image forming devices can be managed safely.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
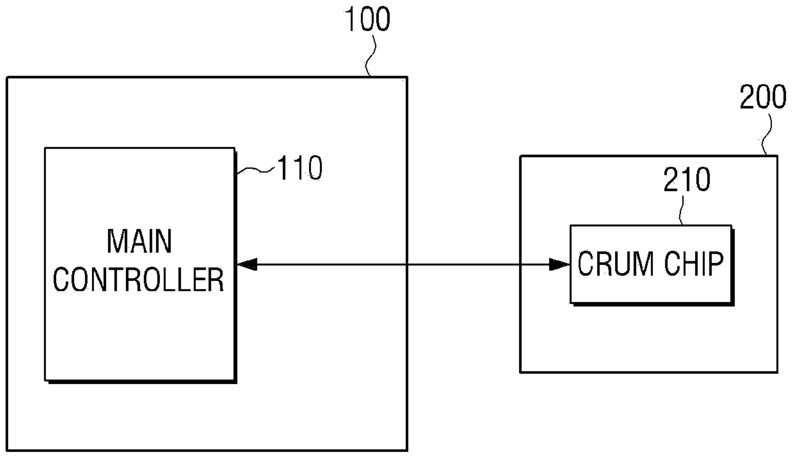
FIG. 1 illustrates an image forming device according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments are discussed in detail below with reference to the accompanying drawings.

In the following description, like drawing reference numerals are used for the similar elements. The matters defined in the description, such as detailed construction and elements, are provided to assist in a comprehensive understanding of exemplary embodiments.

FIG. 1 illustrates a configuration of an image forming device according to an exemplary embodiment. As illustrated in FIG. 1, for example, an image forming device includes a body 100, a controller 110 provided in the body 100, and a consumable unit 200 that can be mounted on the body 100. An image forming device can be embodied as various types of devices such as a printer, scanner, multi-function device, facsimile, or copy machine, which can form images on paper or on other various recording media. According to an exemplary embodiment the body 100 may be a main body of the image forming device and the controller 110 may be a main controller.

The controller 110 may be mounted on the body 100 of the image forming device to control functions of the image forming device. According to an exemplary embodiment, the controller 110 is a main controller that controls all functions of the image forming device.

The consumable unit 200 may be mounted on the body 100 of the image forming device, and can be one of various types of units which involve in the image forming device either directly or indirectly. For instance, in the case of a laser image forming device, electrification units, light exposure units, developing units, transfer units, settlement units, various types of rollers, belts, and OPC drums can be consumable units. Furthermore, various types of units that must be replaced in using an image forming device can be defined as a consumable unit 200.

Each consumable unit 200 may have a predetermined life span. Therefore, a consumable unit 200 may include a microprocessor and/or circuit such as a CRUM chip (Customer Replaceable Unit Monitoring chip) 210 which enables replacement at an appropriate time.

A CRUM chip 210 may be mounted on a consumable unit 200 and record various information. A CRUM chip 210 includes a memory. Therefore, a CRUM chip 210 may be referred to in various terms such as a memory unit, or CRUM memory (Customer Replaceable Unit Monitoring memory), but for the sake of convenience of explanation, the term "CRUM chip" will be used.

In the memory provided in the CRUM chip, various characteristics information regarding the consumable unit 200, the CRUM chip itself, or the image forming device, and also usage information or programs regarding conducting an image forming job may be stored.

Various programs stored in the CRUM chip may include not only general applications, but also O/S (Operating System) programs and encryption programs. Information on the manufacturer of the consumable unit 200, information on manufacturer of the image forming device, names of mountable image forming devices, information on the manufactured date, serial number, model name, electronic signature information, encryption key, and encryption key index may be included in the characteristics information. The usage information may include information such as how many sheets of paper have been printed so far, how many sheets of paper can be printed from now on, and how much toner is left. The characteristics information may also be referred to as unique information instead.

According to an exemplary embodiment, information as illustrated below in Table 1 can be stored in a CRUM chip 210.

| General Information | |
|---|---|
| OS Version | CLP300_V1.30.12.35 02-22-2007 |
| SPL-C Version | 5.24 06-28-2006 |
| Engine Version | 6.01.00(55) |
| USB Serial Number | BH45BAIP914466B. |
| Set Model | DOM |
| Service Start Date | Sep. 29, 2007 |
| **Option** | |
| RAM Size | 32 Mbytes |
| EEPROM Size | 4096 bytes |
| USB Connected (High) | |
| **Consumables Life** | |
| Total Page Count | 774/93 Pages(Color/mono) |
| Fuser Life | 1636 Pages |
| Transfer Roller Life | 864 Pages |
| Trayl Roller Life | 867 Pages |
| Total Image Count | 3251 Images |
| Imaging Unit/Dye Roller Life | 61 Images/19 Pages |
| Transfer Belt Life | 3251 Images |
| Toner Image Count | 14/9/14/19 Images(C/M/Y/K) |
| **Toner Information** | |
| Toner Remains Percent | 99%/91%/92%/100% (C/M/Y/K) |
| Toner Average Coverage | 5%/53%/31%/3% (C/M/Y/K) |
| **Consumables Information** | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| **Color Menu** | |
| Custom Color | Manual Adjust(CMYK: 0,0,0,0) |
| **Setup Menu** | |
| Power Save | 20 Minutes |
| Auto Continue | On |
| Altitude Adj. | Plain |

In the memory of the CRUM chip 210, approximate information of the consumable unit 200, and information on the life, information, and setup menu of the consumable unit 200 may be stored. Besides the body of the image forming device, an O/S provided for use in the consumable unit may be stored in the memory.

The CRUM chip may include a CPU (not illustrated) that can manage the memory, perform various programs stored in the memory, and perform communication with a body of an image forming device or a controller of other devices.

The CPU may drive the O/S stored in the memory of the CRUM chip, and perform initialization of the consumable unit 200 itself, apart from the initialization of the image forming device. The CPU may perform certification between the body of the image forming device when the initialization has completed or during the initialization. Once the initialization is complete, it may perform encryption data communication with the body of the image forming device. Various commands and data transmitted from the body of the image forming device may be encrypted according to an arbitrary encryption algorithm and be transmitted.

In a particular event, for example. such as when power of the image forming device having the consumable unit 200 is on, or when the consumable unit 200 is detached and then attached to the body 100 of the image forming device again, the CPU may perform initialization for itself apart from the initialization of the controller 100. The initialization includes various processes such as initial driving of various application programs used in the consumable unit 200, calculating secret information needed in data communication with the controller 110 after the initialization, setting up a communication channel, initializing a memory value, checking when to replace itself, setting an inner register value of the consumable unit 200, and setting a inner-outer clock signal.

Setting a register value may be defined as an operation of setting functional register values inside the consumable unit 200 so that the consumable unit 200 can operate according to various functional states that a user predetermined. The setting an inner-outer clock signal refers to an operation of adjusting a frequency of an outer clock signal provided from the controller 110 of the image forming device to be in line with the inner clock signal that the CPU inside the consumable unit 200 uses.

Checking when to replace itself may be an operation of identifying the remaining volume of a toner or ink used so far, anticipating when the ink or toner will run out, and notifying the controller 110. Upon determining in the initialization process that the toner volume has already run out, the consumable unit 200 may be embodied to notify the controller 110 that it is in a non-operable state. Since the consumable unit 200 itself has the O/S, various types of initialization may be performed according to the types and characteristics of the consumable unit 200.

Upon the CPU being mounted and the O/S provided, the remaining volume of the consumable unit stored in the memory unit 210 may be identified or the number of refilling times, before the controller 110 requests communication with the unit 200, when the image forming device is turned on. Accordingly, the time of notifying shortage of the consumable unit may be done earlier than before. For instance, when the toner is running short, a user may turn the power on, and then make adjustments for conversion to a toner saving mode and then perform image forming. The same applies to when only a particular toner is running short as well.

The CPU may not respond to a command of the controller 110 until the initialization is under process and then completed. The controller 110 waits for a response while periodically transmitting the command until there is a response.

Accordingly, when a response, that is, an acknowledgement is received, a certification may be performed between the controller 110 and the CPU. In this case, due to the O/S of itself installed in the CRUM chip 210, it is possible to perform a certification through interaction between the CRUM unit 210 and the controller 110.

The controller 110 encrypts data or a command for certification and transmits it to the CRUM chip 210. In the transmitted data, an arbitrary value R1 may be included. Herein, the R1 may be a random value which changes at every certification, or a predetermined fixed value. The CRUM chip that received the data generates a section key using an arbitrary value R2 and the received R1, and then generates an MAC (Message Authentication Code) using the generated section key.

A signal including the MAC generated and the R2 as aforementioned is transmitted to the controller 110. The controller 110 generates the section key using the received R2 and R1, generates the MAC using the generated section key, and then certifies the CRUM chip 210 by comparing the generated MAC and the MAC in the received signal. According to various exemplary embodiments, electronic signature information or key information may be transmitted in such a certification process and used in the certification.

Once a certification is made successfully, the controller 110 and the CRUM chip perform an encryption data communication for data management. That is, when a user command has been input or when an image forming job has been initiated or completed, the controller 110 encrypts the command or data for performing data reading or writing operations using an encryption algorithm, and then transmits it to the CRUM chip 210.

The CRUM chip 210 may decode the received command or data, and perform operations such as data reading or writing corresponding to the decoded command. The encryption algorithm used in the CRUM chip 210 or the controller 110 may be a standardized encryption algorithm. Such an encryption algorithm is changeable when the encryption key has been leaked or when there is a need to strengthen security. Various encryption algorithms such as RSA asymmetric key algorithm, ARIA, TDES, SEED, AES symmetric key algorithm may be used.

As such, between the CRUM chip 210 and the controller 110, communication for certification and data exchange may be performed numerous times. In every communication, signals are transmitted from the controller 110 to the CRUM chip 210 or vice versa. In this case, a transmitted signal includes error detection data for detecting integrity of the data included in the corresponding signal. Such error detection data is data generated by accumulation of error detection data included in the transmitted or received signal from the previous communication.

That is, between the controller 110 and the CRUM chip 210, a plurality of communications may be performed such as certification 1, certification 2, certification 3, . . . , certification n, data communication 1, data communication 2, . . . data communication m. In a signal transmitted at every communication, integrity detection data may be included. In such an integrity detection data, the integrity detection data used in the previous communication is reflected accumulatively.

The side that received the signal detects integrity of the corresponding signal using integrity detection data in the signal. Accordingly, when the corresponding data is determined to be integral, the data and integrity detection data included in that signal may be temporarily stored. A new integrity detection data may be generated using a subsequent data to be transmitted to the side which transmitted the signal and the integrity detection data received from the previously communication and temporarily stored. Accordingly, a signal to which the new integrity detection data has been added may be transmitted to the subsequent data. Between the controller 110 and the CRUM chip 210, such communication which includes such integrity detection data may be performed a plurality of times. When the last communication is performed, a final detection may be performed using the integrity detection data included in the last signal received. If there is nothing wrong with the final detection, all data which has been temporarily stored until then may be recorded.

Figure 2:
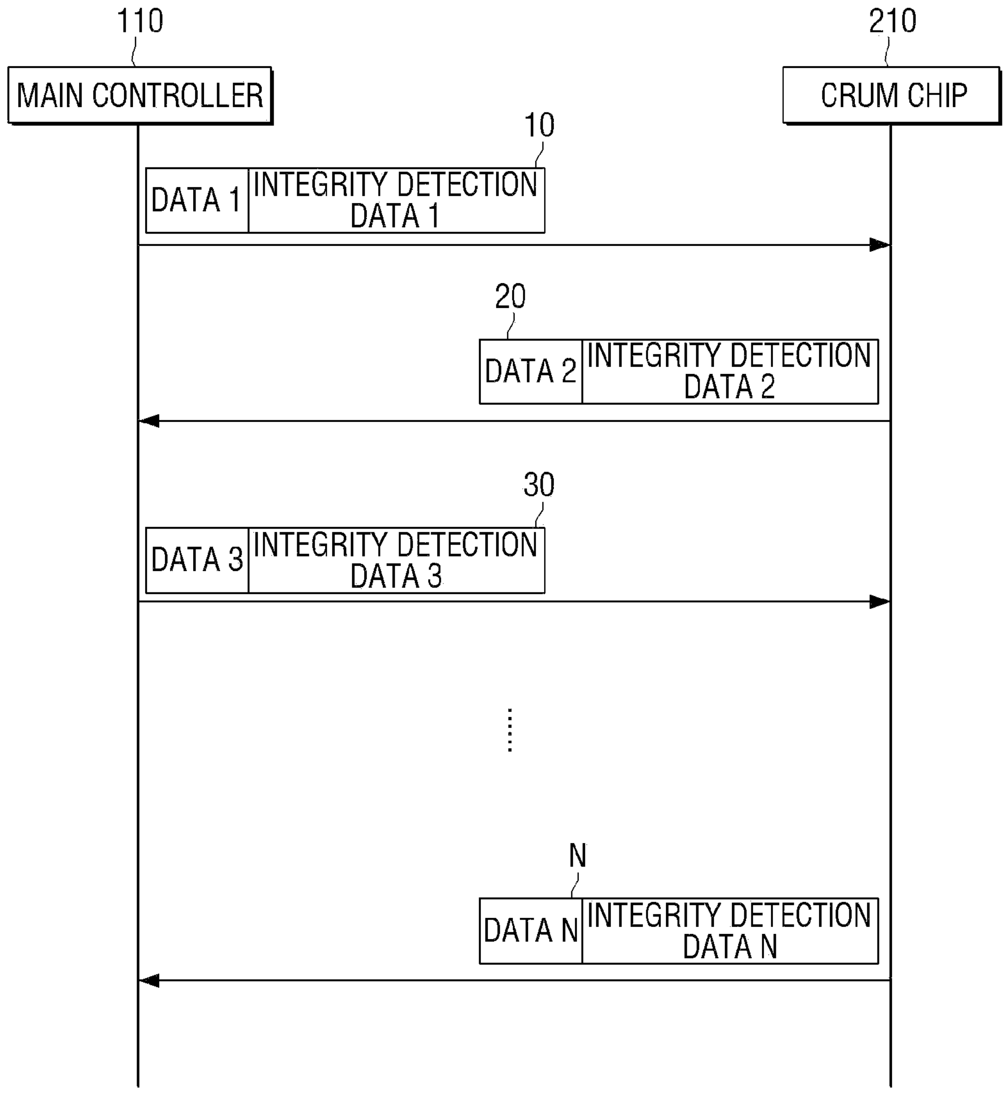
FIG. 2 is a timing view illustrating a communication process between a controller and a CRUM chip in an image forming device according to an exemplary embodiment.

FIG. 2 illustrates an exemplary communication process between the controller 110 and the CRUM chip 210 according to an exemplary embodiment of the present disclosure. According to FIG. 2, the controller 110 transmits a first signal 10 which includes data 1 and integrity detection data 1. The CRUM chip 210 which received the first signal 10 generates integrity detection data 2 using the integrity detection data 1 included in the first signal 10 and data 2. The CRUM chip 210 transmits a second signal which includes the data 2 and the integrity data 2 to the controller 110. As such, the signals (30, . . . , N) which include integrity detection data generated using the integrity detection data from the previous communication are performed for a plurality of times.

A result value of logical calculus on data to be transmitted, a result value generated by applying a predetermined mathematically formula to the data or a result value of encrypting the data, that is, MAC may be used as integrity detection data.

Figure 3:
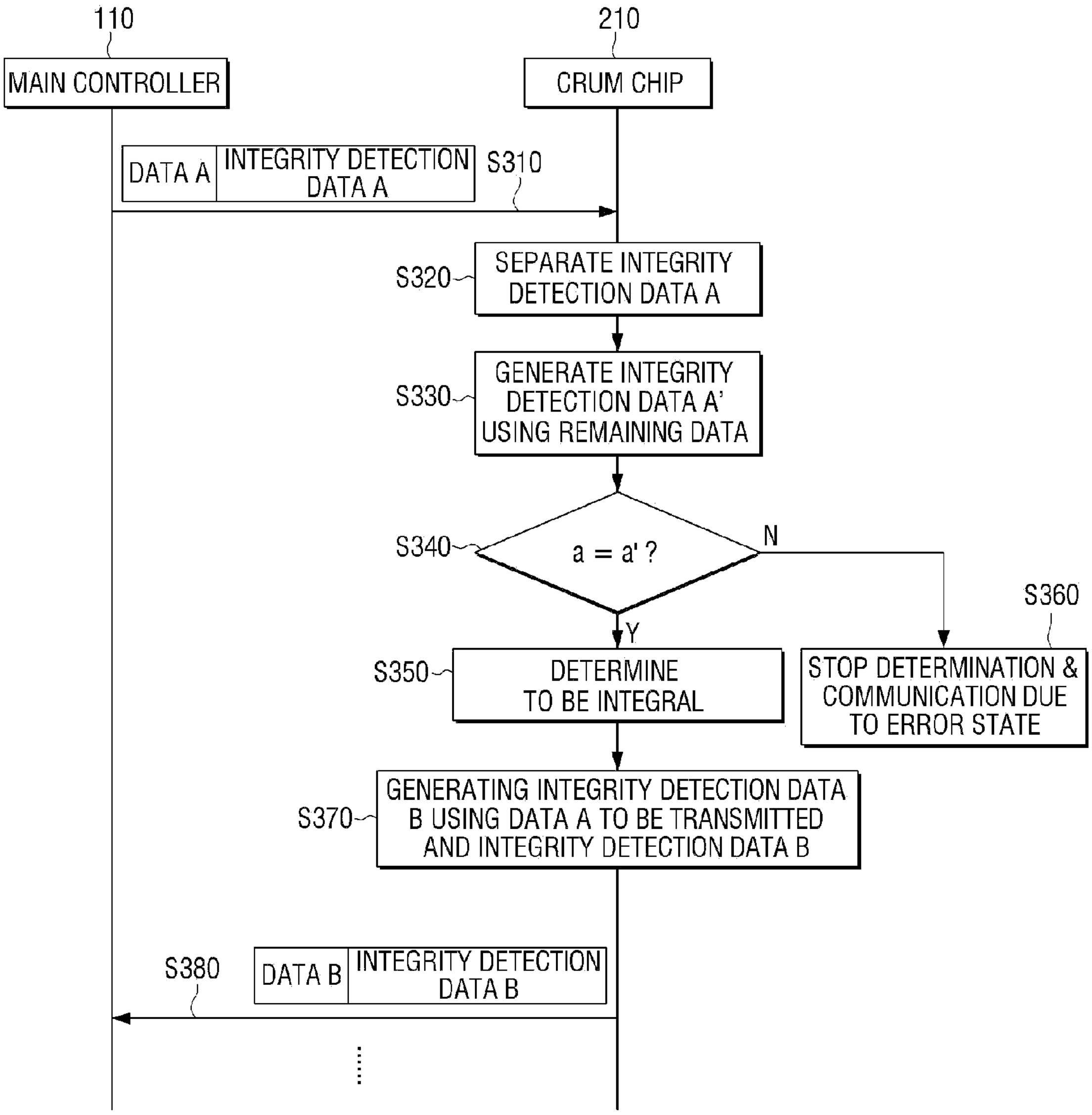
FIG. 3 is a timing view illustrating a process of examining integrity of a signal using an integrity examination data.

FIG. 3 illustrates a detection method using integrity detection data. According to FIG. 3, when a signal which includes data a and integrity detection data a is received (S310), the CRUM chip 210 separates the integrity detection data a (S320).

The CRUM chip 210 generates integrity detection data a' using the remaining data and integrity detection data that it had transmitted during the previous communication (S330). The CRUM chip 210 then compares the integrity detection data a' generated accordingly with the separated integrity detection data a (S340), and if they are identical, determines to be integral (S350). If they are not identical, the CRUM chip 210 determines that the data is in an error state, and stops the communication (S360). For the convenience of explanation, hereinafter, the integrity detection data a' will be referred to as the data subject to comparison.

When it is determined that the corresponding data is integral, integrity detection data b is generated by using data b to be transmitted and the detection data a (S370). Accordingly, a signal which includes the data b and the integrity detection data b is transmitted to the controller 110 (S380).

FIG. 3 illustrates an exemplary detection process performed, for example, in the CRUM chip 210, but the same process may be performed in the controller 110 as well. That is, when the controller 110 receives a signal which includes the data b and the integrity detection data b, it separates the integrity detection data b, and performs detection. This detection method is similar to (S330) to (S370), and thus repeated explanation and illustration will be omitted.

The configuration of signals transmitted and received between the controller 110 and the CRUM chip 210 may be designed in various types. That is, data included in the signals may include at least one of a command, information to be recorded, result information on operations according to the command, result information on integrity detection regarding previously received signals, and indicator information for notifying a location of the integrity detection data. The result information on integrity detection may be excluded from the signals initially transmitted and received between the controller 110 and the CRUM chip 210.

Figure 4:
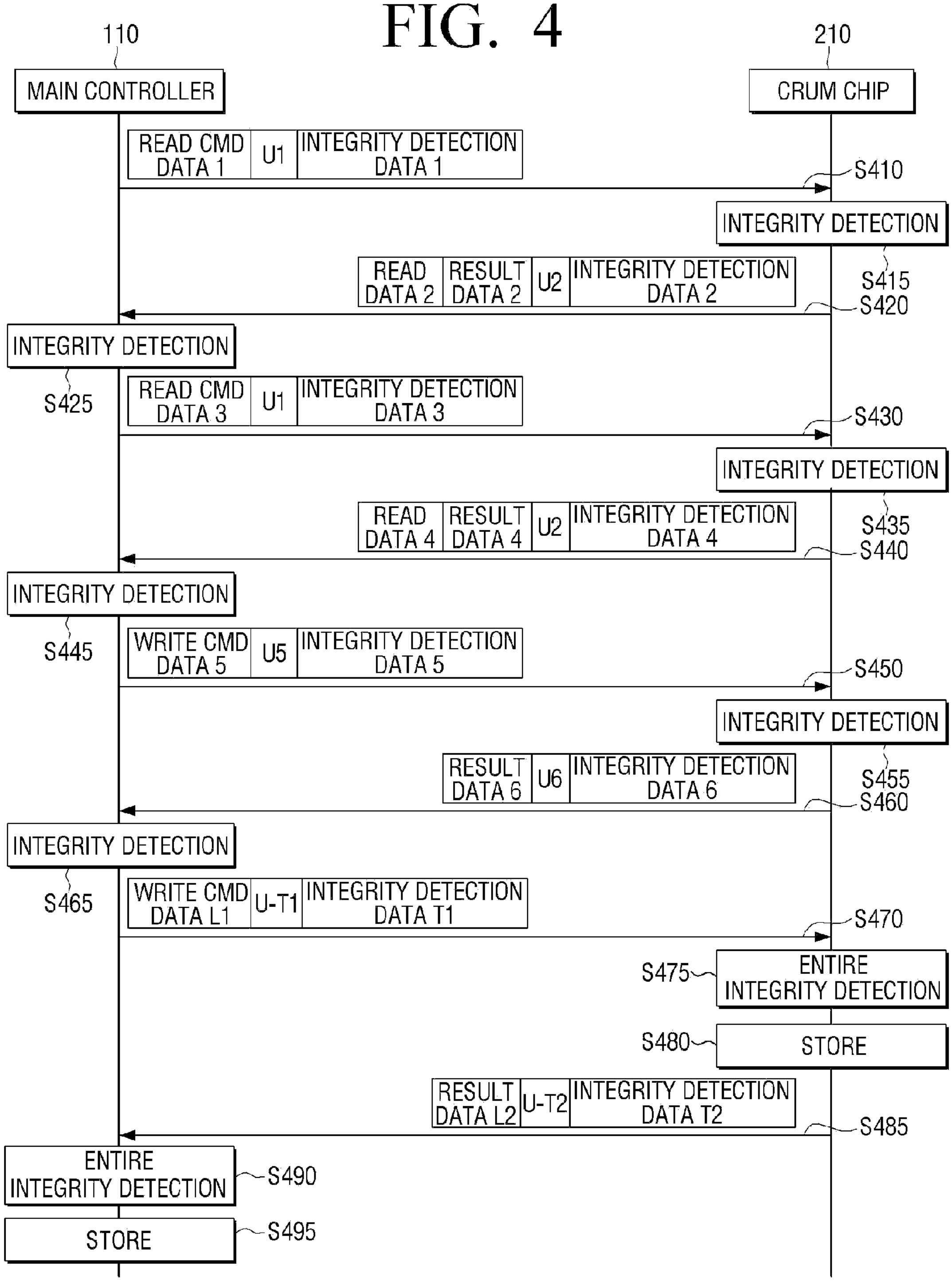
FIG. 4 is a timing view illustrating a communication process between a controller and a CRUM chip in an image forming device according to an exemplary embodiment.

FIG. 4 illustrates an exemplary embodiment of a process of detecting integrity using signals having different formats, for example, different from those of FIG. 2. According to FIG. 4, the controller 110 transmits a signal which includes data and integrity detection data 1 (S410). Herein, the data includes a Read Command (CMD) data 1 and an indicator U1. The Read Command (CMD) data 1 includes not only a command but also a read target or a memory address. The U1 refers to indicator information which follows the Read Command (CMD) data 1. The indicator information U1 refers to a symbol for notifying a location of parsing of the integrity detection data in the signal. The indicator information may be expressed as fixed number of bites. For example, five bytes may be used for the indicator information. On the other hand, the Read Command (CMD) data 1 is variable according to the contents of the data, and thus the size of the integrity detection data 1 is also variable.

When the signal is received, the CRUM chip 210 performs integrity detection using the integrity detection data 1 included in the signal (S415). The CRUM chip 210 is capable of generating integrity detection data 2 using the data to be transmitted and the integrity detection data 1, and transmits the signal which includes these (S420). As illustrated in FIG. 4, in the signal to be transmitted, a Read data 1 which is data read from the memory provided in the consumable unit 100 according to the Read Command (CMD) data 1, a Result data 2 which indicates the result of operation performed according to the Read Command (CMD) data 1, an indicator U2, and an integrity detection data 2 are included.

The controller 110 separates the integrity detection data 2 from the received signal and performs integrity detection (S425). Then, if there exists a subsequent Read Command (CMD) data 3, the controller 110 generates an integrity detection data 3 using the Read Command (CMD) data 3 and the integrity detection data 2, and then transmits a signal which includes the Read Command (CMD) data 3, an indicator U3, and an integrity detection data 3 to the CRUM chip 210 (S430).

As illustrated in FIG. 4, for example, communications using a plurality of integrity detection data 4, 5, 6, T1, and T2 are performed (S440, S450, S460, S470, S485), followed by integrity detections accordingly (S435, W445, S455, S465). When the final communication signal is received from the CRUM chip 210 (S470), the CRUM chip 210 detects integrity of the data which have been transmitted and received in the entire communication process and temporarily stored using integrity detection data T1 included in the final communication signal (S475). If it is determined that the data is integral as a result of the final detection, the data which has been temporarily stored is stored in a non-volatile memory (not illustrated) (S480). Likewise, when the final communication signal is transmitted from the CRUM chip 210, the controller 110 also performs the entire integrity detection using the integrity detection data T2 included in the final communication signal (S490). Accordingly, the data which has been temporarily stored is stored in the non-volatile memory, if it is determined that the data is integral (S495).

The integrity detection data used in such communication processes is generated by accumulating integrity detection data used in the previous communications.

According to an exemplary embodiment, the integrity detection data may be processed as follows:

Integrity detection data 1=E(Read CMD Data 1|U1)

Integrity detection data 2=E(Read CMD Data 2|Result Data 2|U2|Integrity detection data 1

Integrity detection data 3=E(Read CMD Data 3|U3|Integrity detection data 2

Integrity detection data 4=E(Read CMD Data 4|Result Data 4|U4|Integrity detection data 3

Integrity detection data 5=E(Write CMD Data 5|U5|Integrity detection data 4)

Integrity detection data 6=E(Read Data 6|U6|Integrity detection data 5)

Integrity detection data T1=E(Write CMD Data L1|U-T1|Integrity detection data T1-1)

Integrity detection data T2=E(Result Data L2|U-T2|Integrity detection data T1)

In the aforementioned formulas, the term "E( )" indicates a function of applying a predetermined formula to obtain a result value. As such, integrity detection data may be generated from adding the previous integrity detection data and the entire data to be transmitted, applying various logical calculus such as XOR (eXclusive OR), from resulting value of substituting data into other known formulas between the controller 110 and the CRUM chip 210, and from resulting value of encryptions by applying various aforementioned various encryption algorithms.

Figure 5:
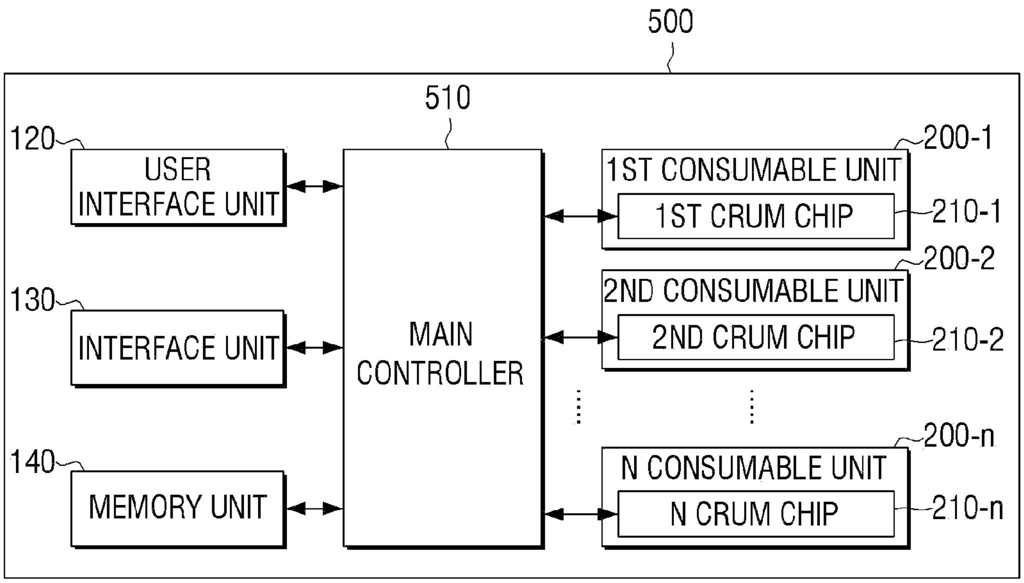
FIG. 5 is a block diagram illustrating an exemplary image forming device mounted on a consumable unit.

FIG. 5 illustrates an exemplary image forming device where a plurality of consumable units 200-1, 200-2, . . . , 200-*n* are provided within the body 500 according to an exemplary embodiment of the present disclosure.

As illustrated in FIG. 5, an image forming device includes a controller 510, a user interface unit 120, an interface unit 130, a memory unit 140, and a plurality of consumable units 200-1, 200-2, . . . , 200-*n*.

The user interface unit 120 performs a role of receiving various commands from the user, or showing and notifying various information. The user interface unit 120 may include an LCD or LED display, at least one button, or a speaker. It may also include a touch screen depending on circumstances.

The interface unit 130 refers to a configuration which may be connected with a wired connection and/or wirelessly with a host PC or various external devices to perform communication. The interface unit 130 may include various types of interfaces such as a local interface, USB (Universal Serial BUS) interface, and a wireless network interface.

The memory unit 140 performs a role of storing various programs or data necessary for driving the image forming device.

The controller 510 performs a role of controlling the entire operations of the image forming device. The controller 510 processes data received through the interface unit 130, and converts the processed data into a format in which image can be formed.

The controller 510 performs an image forming job on the converted data using a plurality of consumable units 200-1, 200-2, . . . , 200-*n*. The consumable unit may be provided in various ways depending on the type of the image forming device.

In the case of a laser printer, electrification units, light exposure units, developing units, transfer units, settlement units, various types of rollers, belts, and OPC drums can be consumable units.

In each consumable unit 200-1, 200-2, . . . , 200-*n*, a first CRUM chip to n CRUM chip 210-1, 210-2, . . . , 210-*n* may be included.

Each CRUM chip may include a memory and CPU etc. At least one of a crypto module, tamper detector, interface unit, clock unit (not illustrated) which outputs clock signals, or random value generating unit (not illustrated) which generates a random value for certification may be included.

The crypto unit (not illustrated) supports the encryption algorithm so that the CPU (not illustrated) can perform certification or encrypted communication with the controller 510. The crypto unit may support a determined algorithm among 4 encryption algorithms such as ARIA, TDES, SEED, and AES symmetric key algorithm. The controller 510 may also support a corresponding algorithm among 4 encryption algorithms. Accordingly, the controller 510 may identify what kind of encryption algorithm is used in the consumable unit 200, proceed with the encryption algorithm, and perform encryption communication.

Consequently, even when a key is issued, regardless of the kind of encryption algorithm applied to the consumable unit 200, the key may be easily mounted on the body 100 and perform encryption communication.

A tamper detector (not illustrated) is a unit for defending various physical hacking attempts, that is, tampering. A tamper detector monitors an operation environment such as voltage, temperature, pressure, light, and frequency, and when there is an attempt such as decap, either erases or physically blocks data. In this case, the tamper detector may have a separate power.

The memory provided inside the CRUM chip 210 may include an O/S memory, non-volatile memory, or volatile memory. The O/S memory (not illustrated) may store the O/S for driving the consumable unit 200. The non-volatile memory (not illustrated) may store various data non-volatility. In the non-volatile memory, various information such as electronic signature information, various encryption algorithm information, information on the state of the consumable unit 200 (for instance, the remaining toner volume, when to exchange the toner, the remaining number of printing sheets etc.), unique information (for instance, manufacturer information, manufacturing date information, serial number, model name of the product etc.), and A/S information may be stored. Data received in the process of communication with the controller may be stored in the non-volatile memory.

The volatile memory (not illustrated) may be used as a temporary storage space needed for operation. In the volatile memory, the data determined to be integral in every communication and the integrity detection data used in each determination may be temporarily stored.

The interface unit (not illustrated) takes a role of connecting the CPU with the controller and may be embodied as a serial interface or a wireless interface. Since the serial interface uses a smaller number of signals than a parallel interface, it has a cost saving effect, and further, it is appropriate in operation environments where there is much noise such as in a printer.

A CRUM chip may be provided in each consumable unit. Each CRUM chip may perform communication with the controller and other CRUM chips. During communication, a new integrity detection data generated by accumulating the integrity detection data used in the previous communication is transmitted.

Figure 6:
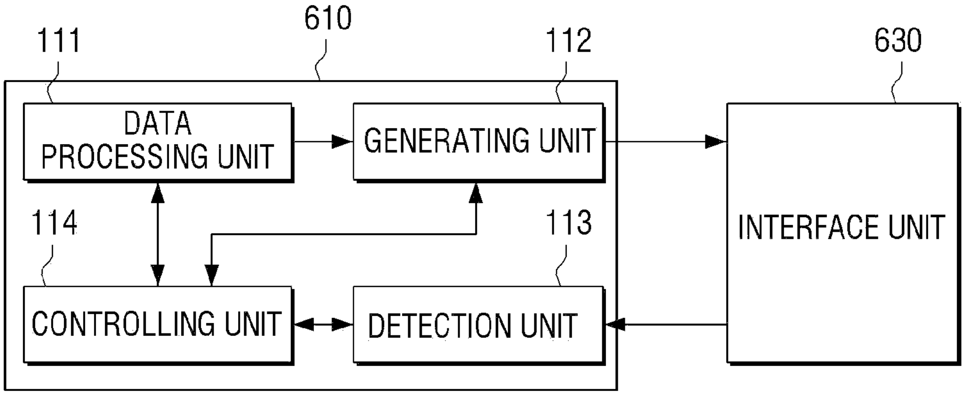
FIGS. 6 and 7 an exemplary image forming device according to various exemplary embodiments.

FIG. 6 illustrates an image forming device according to an exemplary embodiment of the present invention. As illustrated in FIG. 6, for example, an image forming device includes a controller 610 and an interface unit 630, and the controller 610 includes a data processing unit 111, a generating unit 112, a detection unit 113, and a controlling unit 114.

The data processing unit 111 generates data to be transmitted to the CRUM chip mounted on the consumable unit which can be mounted on the image forming device. The data includes at least one of a command and information to be processed by that command. That is, in the case of a read command, an address of a memory to be read or information on the subject to be read may be transmitted together. In the case of a writing command, information to be recorded may be transmitted together. The data processing unit 111 may output data as it is or may encrypt the data and then output it. Various commands such as a command for certification and information related to those commands may be generated in the data processing unit 111. These commands and information may be generated frequently prior to, during, or after performing the image forming job. For instance, when the image forming device is turned on or when the consumable unit 200 is detached and then attached again, or when an initialization command on the image forming job is input, the controller 110 may transmit the certification command or the read command for certification on the consumable unit 200. Accordingly, the controller 610 may identify various information being managed in the consumable unit 200 itself, or may store it in the memory unit 140 of the body of the image forming device 100.

During or after completion of performing the image forming job, the data processing unit 111 may generate a writing command and corresponding information to record information regarding the consumed item, that is, information about the ink or toner, the number of printed pages, the number of printed dots, and history information about the user who performed printing, to the consumable unit 200.

The generating unit 112 generates integrity detection data using data output from the data processing unit 111. The generating unit 112 may simply add up the data output from the data processing unit 111, perform a logical calculus such as XOR, substitute to a predetermined mathematical formula, or encrypt the data using the encryption algorithm, and output the result value as integrity detection data. If there is integrity detection data used in the previous communication, the generating unit 112 accumulates and reflects even that previous integrity detection data together, and generates the integrity detection data.

The integrity detection data generated in the generating unit 112 is added to the data generated in the data processing unit 111 and is transmitted to the interface unit 630. In FIG. 6, it is illustrated as if output of the data processing unit 111 is only provided to the generating unit 112, but the output of the data processing unit 111 may be provided directly to the interface unit 630 or provided to a multiplexer (not illustrated). In the case where a multiplexer is provided, output of the generating unit 112 is also provided as to the multiplexer, and may be transmitted to the interface unit 630 in a signal form where data and integrity detection data is included together.

The interface unit 630 transmits the signal which includes the data and the first integrity detection data to the CRUM chip 210.

The interface unit 630 may receive a response signal from the CRUM chip 210. For the convenience of explanation, the signal transmitted from the interface unit will be referred to as a first signal, and the signal transmitted from the CRUM chip will be referred to as a second signal.

A second integrity detection data included in the second signal is data where the first integrity detection data has been accumulated and reflected.

The detection unit 113 separates the second integrity detection data included in the second signal received through the interface unit 630, and detects integrity of the data included in the second signal. More specifically, the detection unit 113 applies a known method between the CRUM chip 210 regarding the remaining data after separation of the second integrity detection data and the integrity detection data that the controller 610 transmitted previously, and generates integrity detection data.

The detection unit 113 compares the integrity detection data generated accordingly with the second integrity detection data separated from the second signal, and determines whether they are identical. If they are identical, the detection unit 113 determines that the corresponding data is integral, and if they are not identical, the detection unit 113 determines that the corresponding data is in an error state.

The controlling unit 114 performs a subsequent communication according to the detection result by the detection unit 114. That is, if it is determined that the second signal includes data in an error state, the controlling unit 114 may stop the subsequent communication or make another attempt. If it is determined that the second signal is in a normal state, that is, in an integral state, the controlling unit 114 performs the subsequent communication.

According to an exemplary embodiment, upon determining that the corresponding data is in an integral state, the controlling unit 114 may store the corresponding data directly to the memory unit 140.

According to an exemplary embodiment, the controlling unit 114 may temporarily store the data obtained at every communication and the integrity detection data, and once the final communication is complete, record the temporarily stored data in the memory unit 140.

Figure 7:
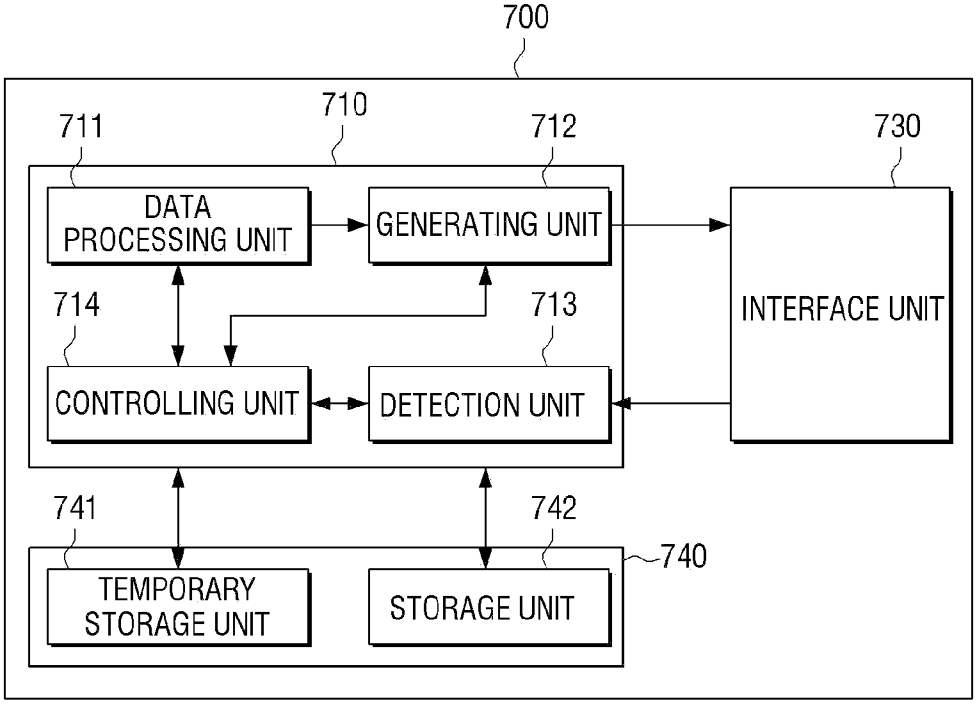

FIG. 7 illustrates an image forming device according to an exemplary embodiment. As illustrated in FIG. 7, the body 700 includes the memory unit 740 besides the controller 710 which includes the data processing unit 711, the generating unit 712, and the detection unit 713, and the controlling unit 714, and the interface unit 730. The memory unit 740 includes a temporary storage unit 741 and a storage unit 742.

Accordingly, in the temporary storage unit 741, the data determined to be integral and the integrity detection data may be temporarily stored. The integrity detection data temporarily stored may be used during integrity detection in the subsequent communication process.

That is, when the second signal regarding the first signal is transmitted after the first signal which includes the first integrity detection data is transmitted to the CRUM chip 210, the detection unit 713 separates the second integrity detection data from the second signal, and generates a new integrity detection data, that is, data subject to comparison, using the remaining data and the integrity detection data stored in the temporary storage unit 741. Thereafter, the detection unit 713 compares the newly generated integrity detection data with the second integrity detection data in the temporary storage unit 741, and may determine integrity of second signal or the data included in the second signal.

The generating unit 712 may generate, for example, a third integrity detection data based on the subsequent data and the second integrity detection data, if there exists a subsequent data to be transmitted to the CRUM chip 210 in the state the second signal is integral. Accordingly, the interface unit 730 transmits the third integrity detection data and the third signal which includes the subsequent data to the CRUM chip 210. That is, as illustrated in FIGS. 2 to 4, the controller and the CRUM chip perform communication numerous times.

The detection unit 713 may perform a final detection on the integrity of the entire signals received during performing the image forming job, using the final integrity detection data included in the signal received in the process of performing the image forming job. That is, as aforementioned, the integrity detection data transmitted and received at every communication is generated by accumulating and reflecting the previous integrity detection data, and thus the final integrity detection data includes all data from the very first integrity detection data to that right before the current one. Therefore, if it is determined that the data is integral, using the final integrity detection data, all data temporarily stored is stored in the storage unit 742 in the memory unit 740, based on the judgment that all communication contents is reliable.

During the first communication, the controller 710 and the CRUM chip 210 include an indicator which notifies that it is the first communication, and then transmit the signal, and during the final communication, include an indicator which notifies that it is the final communication, and then transmit the signal. Accordingly, when it is determined from the signal received from the counterpart, the controller 710 and the CRUM chip 210 performs the aforementioned final detection, and stores the data to the storage unit 742.

Such final detection can be performed when one image forming job is complete, or in every unit of time period predetermined according to exemplary embodiments. It can also be performed when a user command for data storage is input, or when a turn-off command regarding the image forming device is input.

FIGS. 6 and 7 illustrate an exemplary data processing unit, generating unit, detection unit, and the controlling unit are included in the controller, but it is not necessarily limited to such embodiment. That is, at least one of the data processing unit, generating unit, detection unit, and controlling unit may be provided apart from the controller. In this case, unlike as illustrated in FIGS. 1 to 4, the controller may perform only the original function, and communication with the CRUM chip 210 may be performed by the data processing unit, generating unit, detection unit, and the controlling unit.

Figure 8:
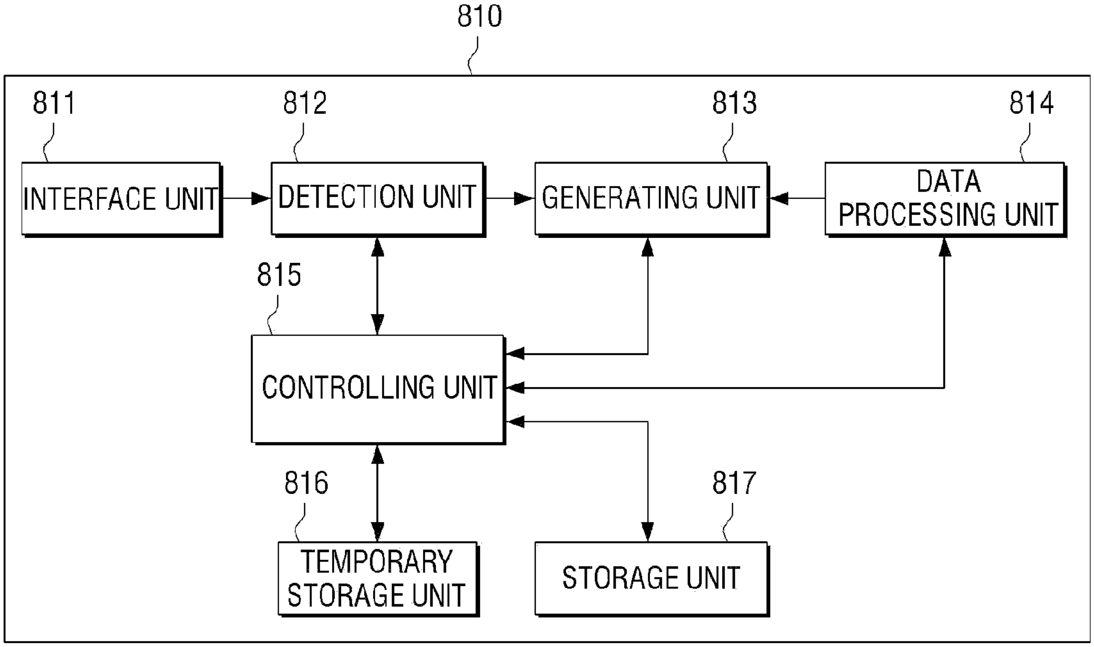
FIG. 8 illustrates a configuration of a CRUM chip according to an exemplary embodiment of the present disclosure.

FIG. 8 illustrates a configuration of a CRUM chip 810 according to an exemplary embodiment of the present disclosure. As illustrated in FIG. 8, the CRUM chip 810 includes an interface unit 811, detection unit 812, generating unit 2813, data processing unit 814, controlling unit 815, temporary storage unit 816, and storage unit 817.

The interface unit 811 receives the first signal which includes the first data and the first integrity detection data from the body of the image forming device, especially the controller mounted on the body.

The detection unit 812 separates the first integrity detection data from the first signal, and detects the integrity of the first signal. The detection method of the detection unit 812 is similar to that illustrated above, and thus repeated explanation will be omitted.

The temporary storage unit 816 temporarily stores the first data and the first integrity detection data, when it is determined that the first signal is integral.

The data processing unit 814 generates the second data when there exists a second data which has to be transmitted to the body of the image forming device.

The generating unit 813 generates the second integrity detection data using the generated second data and the first integrity detection data.

The controlling unit 815 controls the interface unit to transmit the second signal which includes the second data and the second integrity detection data to the body of the image forming device. Besides, the controlling unit 815 controls the entire operations of the CRUM chip. That is, as aforementioned, when the CRUM chip itself has the O/S, the controlling unit 815 may drive the CRUM chip using the O/S. Upon the initialization program being stored, the initialization may be performed separately from the body of the image forming device.

The controlling unit 815 performs an operation corresponding to each command received from the body of the image forming device. That is, when the read command is received, the controlling unit 815 reads the data stored in the storage unit 817 according to that command, and transmits the data to the image forming device through the interface unit 811. In this process, integrity detection data may be added.

Meanwhile, the detection unit 812 performs integrity detection on the third signal when the third signal which includes the third integrity detection data generated by accumulating and reflecting the second integrity detection data.

When the image forming device is completed, the detection unit 812 detects the entire signals received in the process of performing the image forming job, using the final integrity detection data included in the signal received in the process of performing the image forming job. When the communication is completed in the integrity state, the temporary storage unit 816 stores the data which has been temporarily stored in the storage unit 817.

That is, when communication is completed, the controlling unit 815 controls the detection unit 812 to perform the final detection using the final integrity detection data. Accordingly, when it is determined that the corresponding data is integral as a result of the final detection in the detection unit 812, the controlling unit 815 stores the data which has been temporarily stored in the temporary storage unit 816 in the storage unit 817.

Operations of the CRUM chip 810 in FIG. 8 are similar to the operations of the image forming device in FIG. 7. That is, the controller of the image forming device and the CRUM chip of the consumable unit perform operations that similarly correspond to each other, as illustrated in FIGS. 1 to 4. Therefore, both sides should generate the integrity detection data, and should have algorithms which perform detections using the generated integrity detection data.

Figure 9:
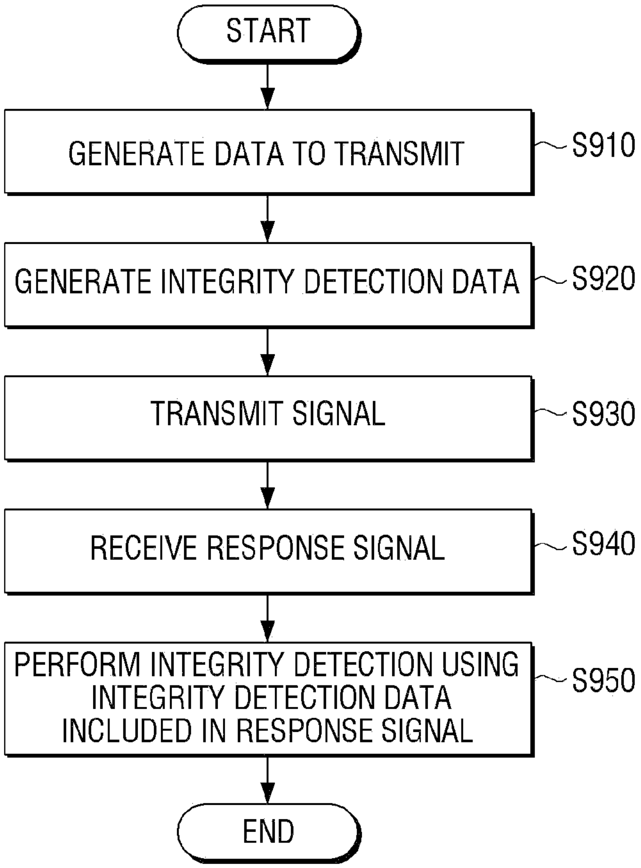
FIGS. 9 and 10 illustrates a communication method according to various exemplary embodiments.

FIG. 9 illustrates a communication method according to an exemplary embodiment of the present disclosure. The communication method illustrated in FIG. 9 may be performed in a controller provided in a body of an image forming device, or in a CRUM chip provided in a consumable unit.

As illustrated in FIG. 9, when data to be transmitted is generated (S910), integrity detection data is generated using that generated data (S920).

Thereafter, the generated integrity detection data and the signal which includes the data are transmitted (S930).

Accordingly, a response signal corresponding to the transmitted signal is received from the counterpart (S940). In the response signal, a new integrity detection data generated by accumulating and reflecting the integrity detection data transmitted from the S930 is included.

The integrity detection is performed using the integrity detection data included in the response signal (S950).

Thus, according to an exemplary embodiment, it is possible to determine integrity of every communication using the previous integrity detection data accumulatively.

Figure 10:
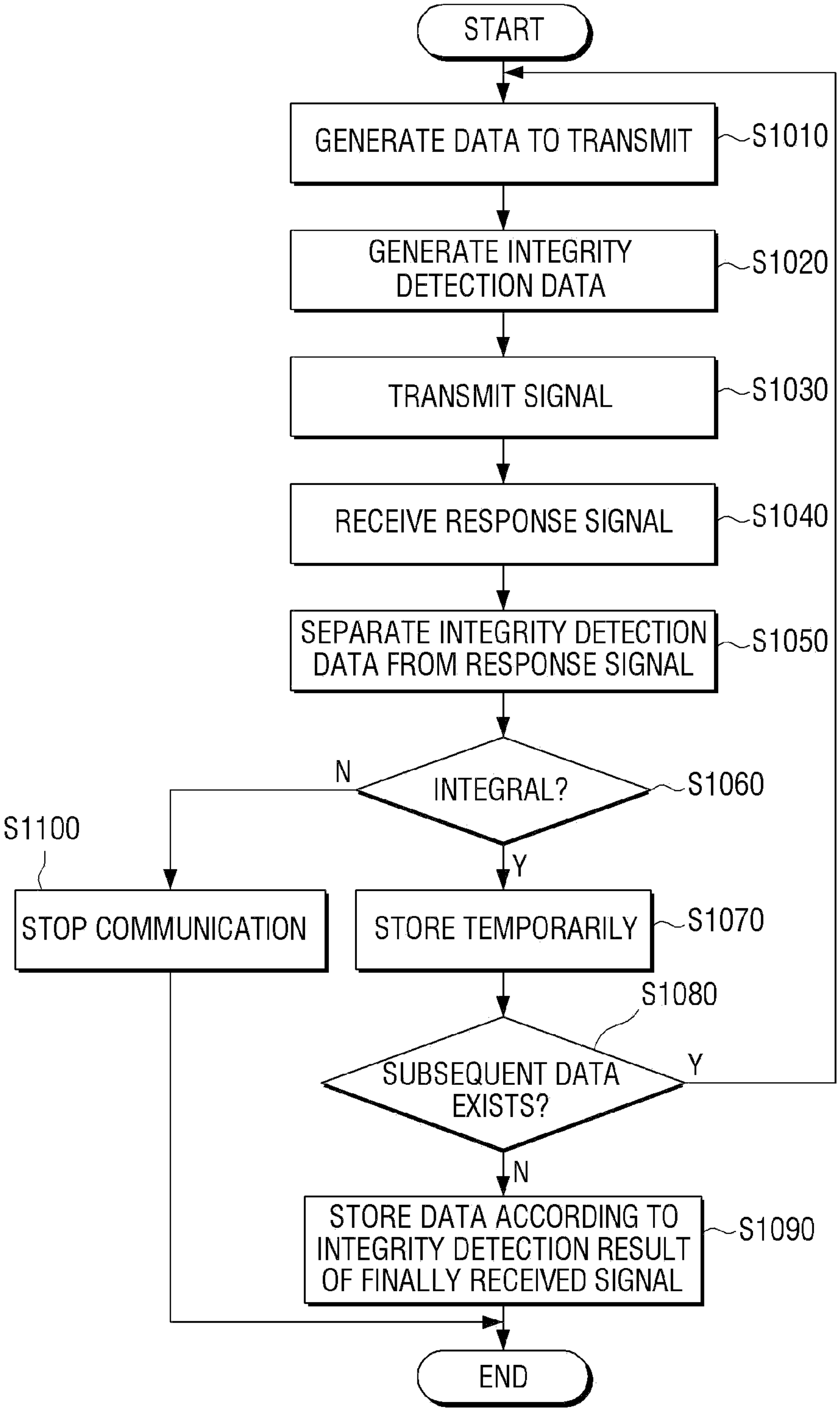

FIG. 10 illustrates a communication method according to a an exemplary embodiment. As illustrated in FIG. 10, when data to be transmitted is generated (S1010), integrity detection data is generated based on that data (S1020). Thereafter, the signal which includes the data and the integrity detection data is transmitted (S1030), and a response signal regarding that signal is received (S1040). Accordingly, the integrity detection data is separated from the response signal (S1050).

Whether the data is integral may be determined using the remaining data from which the integrity detection data has been separated, and the existing integrity detection data (S1060).

If it is determined that the data is integral as a result of the determination, the data is temporarily stored (S1070), whereas if it is determined that the data is in an error state, the communication is stopped (S1100) or another attempt may be performed.

If there exists subsequent data in the temporarily stored state (S1080), the aforementioned stage may be repeatedly performed. If there is no subsequent data, the temporarily stored data is stored according to the integrity detection result of the received signal (S1090).

In the aforementioned exemplary embodiments, except from the integrity detection data transmitted from the controller of the image forming device during the first initialization of the data communication, the integrity detection data is generated by accumulating and reflecting the integrity detection data during the previous communication. As a result, the integrity detection data during the final communication includes all integrity detection data used in the entire communication processes. Therefore, an exact data can be recorded.

Thus, it is possible to safely protect the information on the controller and the CRUM chip from external effects such as noise, poor contact point, and hacking.

According to an exemplary embodiment may be based on the image forming device and the CRUM chip mounted on the consumable unit used in the image forming device, but the aforementioned communication method may be applied to other types of devices as well. For instance, an exemplary embodiment includes may be applied to the case of communication between a device manufactured for communication with the CRUM chip and not the image forming device, and also to the case of communication between a normal electronic device and a memory mounted on a component used in that device.

Programs for performing communication methods according to the various exemplary embodiments of the present disclosure may be stored in various types of recording media and be used.

A code for performing the aforementioned methods may be stored in various types of recording media readable in a terminal, such as RAM (Random Access Memory), flash memory, ROM (Read Only Memory), EPROM (Erasable Programmable ROM), EEPROM (Electronically Erasable and Programmable ROM), register, hard disk, removable disk, memory card, USB memory, and CD-ROM.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Customer Replaceable Unit Monitoring (CRUM) chip operable to communicate with an image forming device, the CRUM chip comprising:

an interface including at least one contact and operable to receive first data and first integrity detection data regarding the first data that is transmitted from a main controller of the image forming device connecting with the at least one contact of the interface;

a controller that is operable to generate second integrity detection data using both second data to be transmitted to the main controller of the image forming device and the first integrity detection data, and that is operable to transmit the second data and the second integrity detection data from the CRUM chip to the main controller of the image forming device.

2. An authentication method of a Customer Replaceable Unit Monitoring (CRUM) chip operable to communicate with an image forming device, the authentication method comprising:

receiving, by the CRUM chip, first data and first integrity detection data regarding the first data from a main controller of the image forming device;

generating second integrity detection data using both second data and the first integrity detection data; and transmitting, from the CRUM chip, the second data and the second integrity detection data to the main controller of the image forming device.

3. The CRUM chip according to claim 1, wherein the controller is operable to transmit the second data and the second integrity detection data to the main controller of the image forming apparatus in response to integrity of the first data being verified.

4. The CRUM chip according to claim 1, further comprising:

a storage for storing the first integrity detection data and the second integrity detection data.

5. The CRUM chip according to claim 1, wherein the controller is operable to generate fourth integrity detection data using the first to third integrity detection data and fourth data to be transmitted to the main controller of the image forming apparatus, in response to third data and third integrity detection data regarding the third data being received from the main controller of the image forming apparatus, and to transmit the fourth data and the fourth integrity detection data to the main controller of the image forming apparatus.

6. The CRUM chip according to claim 5, wherein the controller is operable to detect integrity of the third data using the third integrity detection data and the stored first to second integrity detection data.

7. The CRUM chip according to claim 1, wherein the first data comprise first arbitrary value, and the second data comprise second arbitrary value and Message Authentication Code generated using the first data and the second data.

8. The method according to claim 2, further comprising:

testing integrity of the first data using the first integrity detection data.

9. The method according to claim 2, further comprising:

storing the first and second integrity detection data.

10. The method according to claim 2, further comprising:

receiving from the main controller of the image forming apparatus third data and third integrity detection data regarding the third data;

generating fourth integrity detection data using fourth data to be transmitted to the main controller of the image forming apparatus and the first to third integrity detection data; and transmitting the fourth data and the fourth integrity detection data to the main controller of the image forming apparatus.

11. The method according to claim 10, further comprising:

testing the third data using the third integrity detection data and the first to second integrity detection data.

12. The method according to claim 2, wherein the first data comprise first arbitrary value, and the second data comprise second arbitrary value and Message Authentication Code generated using the first data and the second data.

13. A consumable apparatus, comprising:

a consumable unit that is mounted on an image forming apparatus; and a Customer Replaceable Unit Monitoring, CRUM, chip of claim 1.

14. The consumable apparatus according to claim 13, the consumable unit is any one of a electrification device, a light exposure device, a developing device, a transfer device, a settlement device, a roller, a belt, and an OPC drum.

15. The CRUM chip according to claim 1, wherein the interface includes an Inter-Integrated Circuit (I2C).

* * * * *